United States Patent
Faizan et al.

(10) Patent No.: US 11,858,756 B2
(45) Date of Patent: Jan. 2, 2024

(54) HIGH-SPEED PRESSURE BASED PROPULSION SYSTEM FOR TRANSPORTING RESOURCES

(71) Applicant: Mirza Faizan, Irving, TX (US)

(72) Inventors: Mirza Faizan, Irving, TX (US); Mirza Rizwan, Patna (IN); Summan Rahman, Murphy, TX (US); Aiman Rahman, Murphy, TX (US); Daanish Sheikh, Houston, TX (US); Roohie Sheikh, Houston, TX (US); Ridah Shaista Shanavas, Hyderabad (IN); Mansoor Hasan Khan, Aligarh (IN); Saadia Asaf, Aligarh (IN)

( * ) Notice: Subject to any disclaimer, the term of this patent is extended or adjusted under 35 U.S.C. 154(b) by 81 days.

(21) Appl. No.: 17/339,227

(22) Filed: Jun. 4, 2021

(65) Prior Publication Data

US 2022/0388788 A1  Dec. 8, 2022

(51) Int. Cl.
   *B65G 51/44*  (2006.01)

(52) U.S. Cl.
   CPC ...... *B65G 51/44* (2013.01); *B65G 2201/0285* (2013.01); *B65G 2203/0216* (2013.01); *B65G 2203/0233* (2013.01); *B65G 2203/046* (2013.01)

(58) Field of Classification Search
   CPC ................. B65G 51/44; B61B 13/10
   See application file for complete search history.

(56) References Cited

U.S. PATENT DOCUMENTS

| | | | |
|---|---|---|---|
| 9,511,959 B2 * | 12/2016 | Bambrogan | B61B 13/10 |
| 2021/0362758 A1 * | 11/2021 | Bambrogan | E01F 13/12 |

FOREIGN PATENT DOCUMENTS

| | | | | |
|---|---|---|---|---|
| AT | 12140 U1 * | 9/2011 | | B61B 5/02 |
| WO | WO-2019099417 A1 * | 5/2019 | | B60L 13/06 |

* cited by examiner

*Primary Examiner* — William R Harp

(57) ABSTRACT

A high-speed pressure based propulsion system for transporting resources is disclosed. The system comprising: a plurality of cars; an electronic track configured to carry said plurality of cars; an automatic guidance system configured to establish a route for said plurality of cars on said electronic track based on one or more pre-defined parameters; a plurality of electronically controlled stations configured to facilitate one or more task on said routed plurality of cars for transportation of resources. The disclosed system facilitates movement of food from one place to another by use of fast speed HYPERLOOP™ technology and thereby tries to solves the issue of malnutrition in under developed nations.

7 Claims, 6 Drawing Sheets

HIGH-SPEED PRESSURE BASED PROPULSION SYSTEM FOR TRANSPORTING RESOURCES

TECHNICAL FIELD

The present invention relates high speed transportation. In particular, the present invention relates to HYPERLOOP™ based high-speed transportation system for transporting resources from one place to another at a long distance. More particular, the present system relates to a high-speed pressure based propulsion system for transporting resources.

BACKGROUND OF THE INVENTION

Traditional transportation modes via water, land, rail, and air revolutionized the movement and growth of our current culture. The adverse environmental, societal and economic impacts of these traditional modes of transportation, however, initiated a movement to find alternative modes of transportation that take advantage of the significant improvements in transportation technology so as to efficiently move materials between locations. High-speed transportation systems utilizing rails or other structural guidance components have been contemplated as a solution to existing transportation challenges and reducing the overall time.

Furthermore, as per global agencies survey and records, it has been observed, that Malnutrition in sub-Saharan Africa affects a staggering 220 million people, while European food wastage amounts to nearly 88 million tons of food. Hence, there is a severe problem of malnutrition amongst the African nations, on the other hand there is surplus food wastage in other parts of the world. However, there is no means to transport the food/products from one place to another in a short span of time.

Henceforth, there is an utmost need to figure out a high-speed pressure based propulsion system for transporting resources from one place to another within a very short span of time.

The present invention addresses the issues as discussed above.

SUMMARY OF THE INVENTION

A high-speed pressure based propulsion system for transporting resources is disclosed. The system comprising: a plurality of cars; an electronic track configured to carry said plurality of cars; an automatic guidance system configured to establish a route for said plurality of cars on said electronic track based on one or more pre-defined parameters; a plurality of electronically controlled stations configured to facilitate one or more task on said routed plurality of cars for transportation of resources.

In addition to one or more of the features described above or below, or as an alternative, the high-speed transportation system for transporting resources further comprises one or more sensors configured to track real time positions of said plurality of cars.

In addition to one or more of the features described above or below, or as an alternative the high-speed transportation system for transporting resources further comprises an alarming system.

In addition to one or more of the features described above or below, or as an alternative the high-speed transportation system for transporting resources wherein said plurality of cars are tagged with RFID or electronic chip.

In addition to one or more of the features described above or below, or as an alternative the high-speed transportation system for transporting resources wherein said electronic track is a closed loop track.

In addition to one or more of the features described above or below, or as an alternative the high-speed transportation system for transporting resources wherein said automatic guidance system determines path of each of said plurality of cars based on at least a destination code or a unique identifier.

In addition to one or more of the features described above or below, or as an alternative the high-speed transportation system for transporting resources further comprises one or more storage mediums.

In addition to one or more of the features described above or below, or as an alternative the high-speed transportation system for transporting resources further comprises a turnable loops in between said electronic track.

In addition to one or more of the features described above or below, or as an alternative the high-speed transportation system for transporting resources, wherein said turnable tracks are configured to reroute each of said plurality of cars to a correct destination based on destination code embedded in RFID or electronic tag.

In addition to one or more of the features described above or below, or as an alternative the high-speed transportation system for transporting resources further comprising a controller for controlling each of said plurality of cars on said electronic track for a pre determined time interval.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention Other objects, advantages, and features of this invention will become more apparent from the following description.

The details of one or more implementations are set forth in the accompanying description below. Other aspects, features, and advantages of the subject matter disclosed herein will be apparent from the description and the claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

Figure 1:
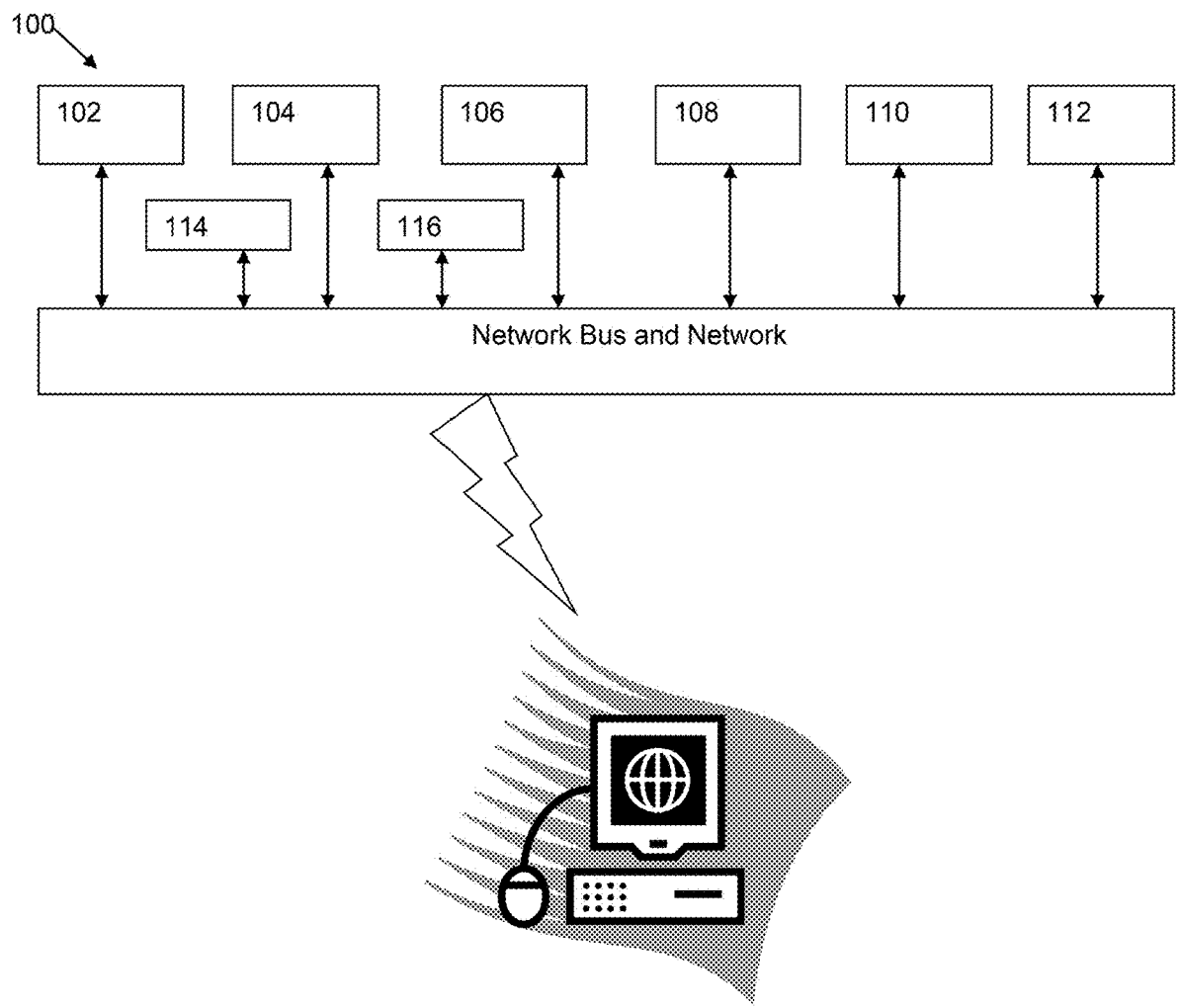

The following figure depicts a certain illustrative embodiment of the invention. This depicted embodiment is to be understood as illustrative of the invention and not as limiting in any way.

Referring particularly to the drawing for the purpose of illustration only and not limitation, there is illustrated:

FIG. 1 is an system environment for use in accordance with the embodiments of control systems described herein.

Figure 2:
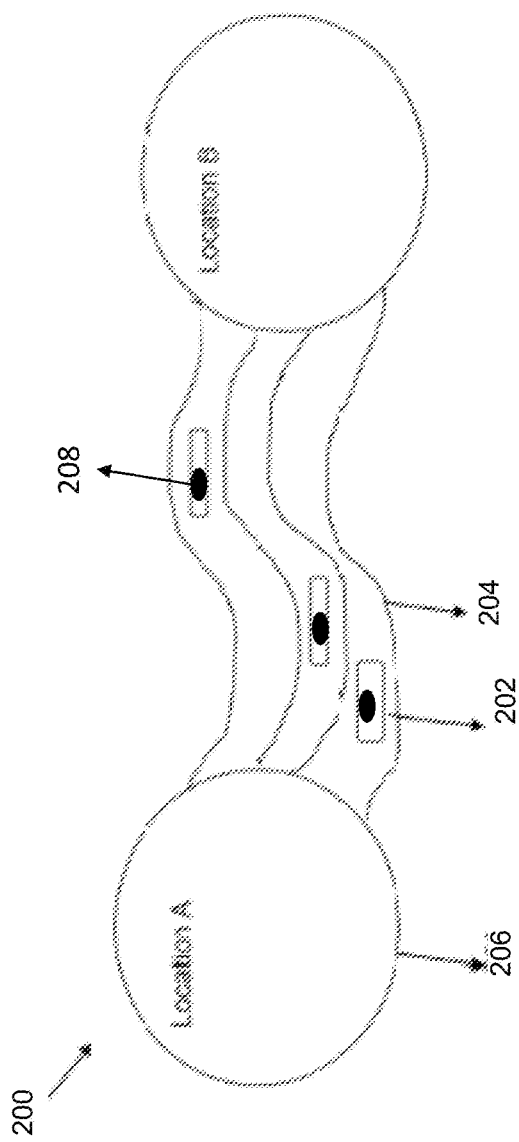
Figure 3:
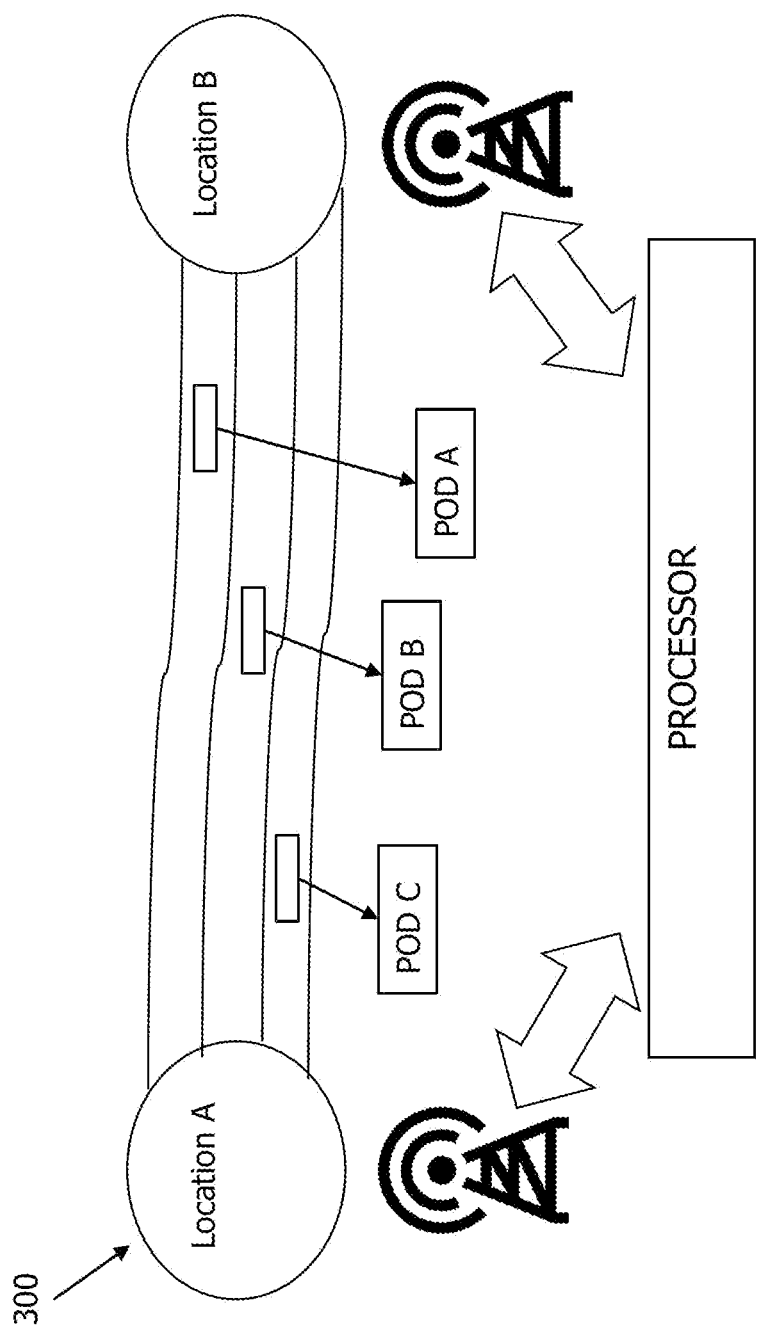
Figure 4:
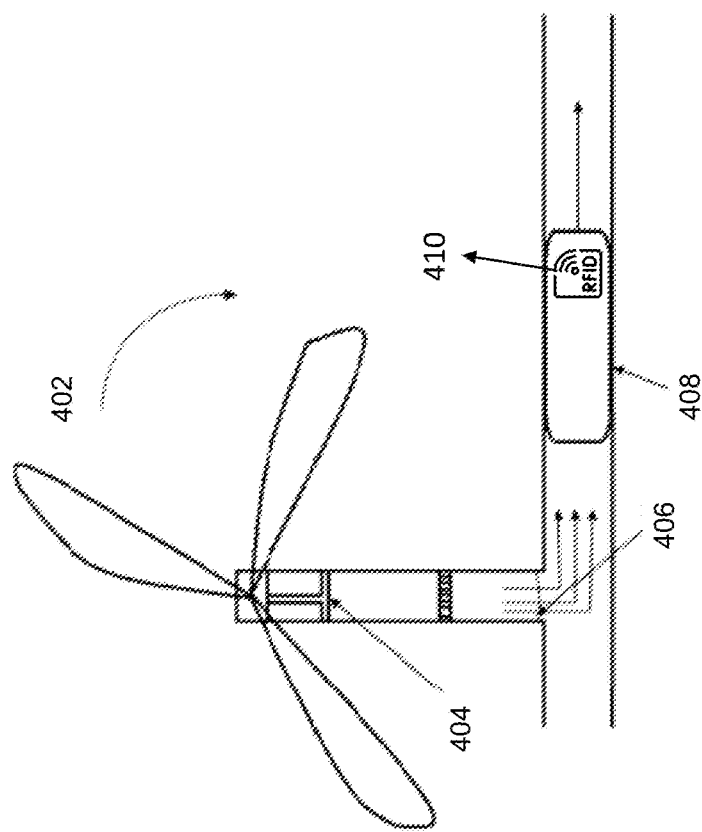
Figure 5:
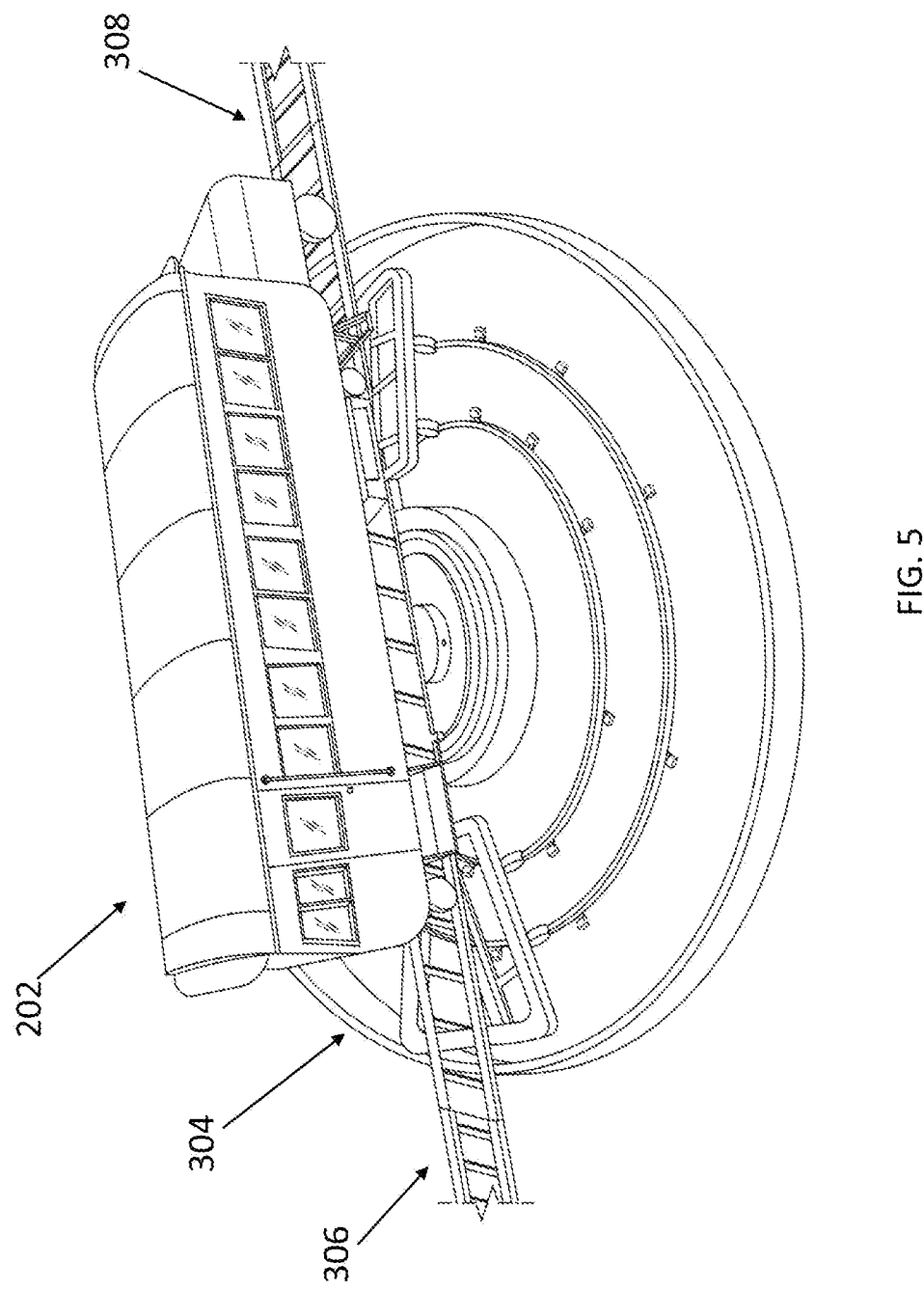
Figure 6:
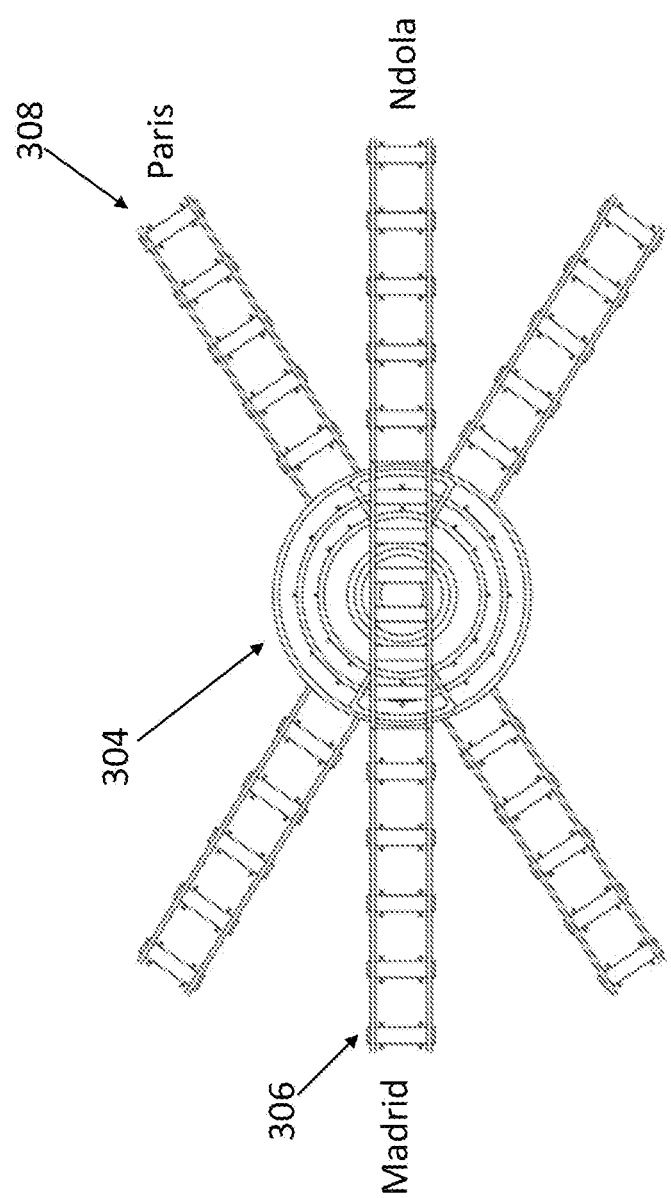

FIG. 2 is a schematic view of the transportation system in accordance with embodiments of the present invention;

FIG. 3 is an exemplary path of the transportation system in accordance with embodiments of the present invention; and FIG. 4 is an exemplary vaccum tube in accordance with an embodiment of the present invention. FIG. 5 and FIG. 6 are exemplary views of a turnable like device.

DETAILED DESCRIPTION OF DRAWINGS

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

FIG. 1 is a system environment for use in accordance with the embodiments of control systems described herein.

FIG. 1 is a system in accordance with the embodiments described herein. The system 100 may include a computer system. The computer system 102 may operate as a stand-alone device or may be connected to other systems or peripheral devices. For example, the computer system 102 may include, or be included within, any one or more servers, systems, communication networks.

The computer system 102 may operate in the capacity of a server in a network environment, or in the capacity of a client user computer in the network environment. The computer system 102 may be implemented as, or incorporated into, various devices, such as a personal computer, a tablet computer, a set-top box, a personal digital assistant, a mobile device, a laptop computer, a desktop computer, a communications device or any other machine capable of executing a set of instructions that specify actions to be taken by that device.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof.

As shown in FIG. 1, the computer system 102 may include a computer display 108, such as a liquid crystal display, an organic light emitting diode, a solid state display, a plasma display, or any other known display. The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device.

FIG. 2 is a schematic view of the transportation system in accordance with embodiments of the present invention.

As shown in FIG. 2, a transportation system 200 in accordance with embodiments of the present disclosure is illustrated. In embodiments, the transportation system 200 comprises one or more capsules or transport pods or cars 202 traveling through at least one tube 204 between two or more stations 206. In one exemplary embodiment of the present disclosure, the one or more cars 202 of the transportation system 200 move through a low-pressure environment within the at least one tube 204. Furthermore, the path of the car may be pre determined and dedicated, and in case if it goes wrong, then the car may be stopped instantly. In accordance with certain aspects of the disclosure, a low-pressure environment includes (but is not limited to) any pressure that is below 1 atmosphere (or approximately 1 bar) at sea level.

In an exemplary embodiment of the present disclosure, a system comprises one or more partially evacuated tubes 204 that connect, for example, stations 206 in a closed loop system. These evacuated tubes may be connecting one or more places and may have midway interchange options, wherein the cars may interchange the routes as per the allocated map by the processor. In other alternate embodiments, the system may include a one-way connection between an origin and a destination. In embodiments, tubes 204 may be sized for optimal air flow around the capsule 202 to improve performance and energy consumption efficiency at the expected or design travel speed.

In embodiments, the capsule may be levitated over a track using a pressurized fluid flow (e.g., air or liquid) exiting out, e.g., a bottom side of the capsule and interacting with the corresponding track. In further embodiments, the capsule may be levitated using, for example, passive magnetic levitation for example, non-superconducting magnets. In certain embodiments, the capsule may be levitated using rockets, wings, aerodynamic (control) surfaces, ion engines, electromagnets, and/or slipper pads. Additionally, the capsule may include one or more permanent magnets. By utilizing passive magnetic levitation, a high lift-to-drag ration can be achieved, which results in a very low power consumption. Furthermore, to transport the pod within the tube, poles of the magnets may be changed by using electrical currents. This concept, along with an increase in velocity would cause the pod to accelerate in a certain direction. Then, to decelerate the pod, again switching of the poles may be done, so that they would be opposing.

In an embodiment of the present invention, each of the car or the pod may have a barcode embedded. The bar code may have details about the source and the destination and specific timelines.

By implementing aspects of the present disclosure, the capsules are operable or available on-demand, which further enables an on-demand food supply from one place to other. For example, in embodiments, capsules may depart a station as (e.g., launched in a tube of the transportation system), as frequently as every ten seconds within a place from where the food has to be collected and reaches plurality of destinations where the food has to be delivered.

In an exemplary embodiment, the transportation system may be configured to shut down (e.g., temporarily), to slow the speeds of capsule in the system in case of any emergency. In an embodiment, the car may be equipped with plurality of sensors 208 to detect extreme conditions (e.g., larger than normal waves, impactful weather) and actively control, for example, portions of the transportation system to adjust for the conditions. Such sensors 208 may include, e.g., accelerometers, gyroscopes, and/or optical sensors. The system may utilize the communication capabilities of the tubes and/or capsules to send and/or receive instructions for adjustments to the speed there through and/or adjustments for alignment of the tube sections.

In accordance with aspects of the disclosure, the capsules, elements of the tube, and the track are able to communicate with each other so as to, for example, control a capsule traveling within the tube and/or control operating conditions of the tube or track. As one example, spacing between capsules within the same tube may be maintained using autonomous vehicles that are aware of the other capsules' relative location. By autonomous, it should be understood that the vehicle is not driven by an operator on the vehicle, but is operated using at least one computerized controller. Thus, if a car carrying the food ahead on the tube path has slowed (e.g., due to a malfunction), then other capsules upstream of the slowed capsule may include sensors to detect, recognize, and analyze such a situation, and may slow the velocity of the upstream capsules. As another example, the capsules may be in communication with a central command (which is aware of the location and speed of each capsule in the system), and receive an instruction from a central control to slow the velocity of the capsule if a capsule in front of said capsule is moving too slowly.

In embodiments, the capsules may each be equipped with onboard emergency power systems sufficient to provide auxiliary propulsion to the capsule (e.g., to propel the capsule (or cause the capsule to crawl) to the next station or to an emergency egress) in the event of an emergency (e.g., loss of low-pressure environment).

FIG. 3 is an exemplary path of the transportation system in accordance with embodiments of the present invention.

In an exemplary embodiment, there may be plurality of cars or pods configured to load and unload the food from source to destination (for ex: 3 pods or cars marked as A, B, and C). Now these pods were configured to travel in X, Y, and Z directions respectively after collecting the food from the source place. Now, all 3 pods are ready on dedicated path at specific time intervals in a single direction, as pod A will go from one source to destination from 7 to 10 AM, pod B will go from one source to destination from 7 to 10 AM but have to cross an intercrossing with pod C, which is also running at same time, but from a different source. Now the automatic system will guide the pods to a correct direction, in a guidance based system, if the pod is going towards a wrong direction. This tracking may be done with the RFID or electronic chips 410 embedded on the pods. If the RFID scanner scans a pod with a wrong code, then the pod will be rejected from the system.

In an exemplary embodiment, a high-speed transportation system for transporting resources (including but not limited to material goods, currency, human resources, etc.) comprising of the following technologies may be disclosed.

A FUBE Exchanger 304 (food tube) as shown in FIG. 5 and FIG. 6 may be a turnable like device that connects intersections of FUBE track (for example, track 306 and track 308) in a hub like manner. The device rotates to allow cars 202 on the track (for example, track 306 or track 308) to enter the hub 318 from any track (for example, track 306) and exit the hub 318 on any other track (for example, track 308).

A FUBE Automatic Guidance System that may be a system we have created to help guide each car through the distribution process. This system works by scanning some identification, for instance using an RFID scanner and barcode, located on each car. In this example, the barcode will determine where each car will go; if the car is being transported from Madrid to Ndola, the barcode might say "MA-ND". Our system will work by allocating a portion of time to a certain location, similar to that of a train station. For example, from 7 A.M. to 8 A.M, every car would go from the Madrid center would be transported to the Paris center. If by mistake a car that should not go to that specific location is inserted, the machine will automatically reject the car, and it will be removed.

A FUBE Reception and Storage Centre 300 that may aim to receive and store the food; built on repurposed tobacco farmland that are converted into FUBE receiving and storage centres. Because the system may have large quantities of food coming in, the requirement of the system is to establish an established organization system using similar identification techniques as those the FUBE Automatic Guidance System uses. For instance, when using the aforementioned RFID scanner and barcode, a car being transported from Madrid to Ndola containing food items that must be refrigerated would have a barcode that reads "MA-ND-RF". In European cities, receiving & storage centres will serve to receive, store and distribute letters and parcels.

A FUBE track comprising a rail like length that serves to carry cars along the track to another destination. Said rails can achieve high velocity with, but not limited to, technologies such as magnetic levitation, ball bearing track, pneumatic tubing, etc. Said track should forego friction or attempt to minimize friction to a negligible degree. For instance, a possible design would be to create a depressurized vacuum tube with conductive electromagnetic rails inside the tube. A series of electromagnets attached to the rails would alternate between a negative and positive pole, causing an electric potential difference between sections of the rail, pushing the car forward.

A FUBE car comprising of a pod like chamber to hold any resource and hold an independent internal environment that will use the aforementioned FUBE track to travel the length of the rail at high velocities, equipped with emergency brakes and copious storage space. An example of this would be an airtight conductive pod that carries a negative charge, making it receptive to the potential difference of alternating pole magnetic rails in the previous example. Through magnetic levitation, this pod would forego friction in the airtight FUBE track and achieve incredible speeds through constant acceleration.

A FUBE mailing centre that may aim to use shipping and receiving ports at FUBE track stops and intersections to act as a drop off and pick up point for any form of courier service, including but not limited to, paper mail, packages, and fragile shipments. These mailing centres should be attached to FUBE Reception and Storage Centres and can interact with a smaller delivery system to deliver courier goods to individual households and firms throughout a local or provincial area.

FIG. 4 illustrates an exemplary vacuum tube 400 in accordance with the disclosed invention. The vacuum tube is enabled by a wind turbine fan 402 rotating based on a speed of the winds, and a piston 404 to create pressure inside the tube. The tube comprises compressed air and an airflow control valve 406 to enable the airflow speed and thereby enabling the pod 408 to move in a pre determined direction based on the invention.

It is therefore submitted that the instant invention has been shown and described in what is considered to be the most practical and preferred embodiments. It is recognized, however, that departures may be made within the scope of the invention and that obvious modification will occur to a person skilled in the art. With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specification are intended to be encompassed by the present invention.

It is noted that various connections are set forth between elements in the description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Various embodiments of the invention have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While in the foregoing specification, several embodiments of the invention have been set forth for purposes of making a complete disclosure, it will be apparent to those skilled in the art that numerous changes may be made without departing from the spirit and principles of the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Although the present invention has been explained in relation to its some embodiments, it is to be understood that many other possible modifications and variations can be made without departing from the Spirit and Scope of the invention as hereinafter claimed.

What is claimed is:

1. A wind turbine powered compressed air based propulsion system for transporting resources, said system comprising:
    a tube comprising an airflow control valve configured to enable speed of airflow;
    a wind turbine comprising a wind turbine fan and a piston, wherein the wind turbine fan controls the piston to create compressed air for propelling a plurality of cars through said tube;
    a plurality of tracks configured to carry said plurality of cars;
    a processor configured to determine a route for said plurality of cars on said plurality of tracks based on one or more pre-defined parameters;
    a plurality of electronically controlled stations configured to facilitate one or more task on said routed plurality of cars for transportation of resources; and
    a turnable loop configured to rotate for allowing a car of said plurality of cars to enter a hub from a first track of said plurality of tracks and exit the hub from a second track of said plurality of tracks, wherein said processor is further configured to:
        allocate a portion of time to each pair of stations among said plurality of electronically controlled stations, wherein
            each station of said plurality of stations is associated with a respective location, and
            each pair of stations includes a source station and a destination station;
        determine whether a car of said plurality of cars is at the source station and destined to the destination station within the allocated portion of time; and
        reject said car from insertion to the source station based on the determination that said car is not destined to the destination station within the allocated portion of time.

2. The wind turbine powered compressed air based propulsion system for transporting resources as claimed in claim 1, further comprises one or more sensors configured to track real time positions of said plurality of cars.

3. The wind turbine powered compressed air based propulsion system for transporting resources as claimed in claim 1, wherein said plurality of cars are tagged with RFID or electronic chip.

4. The wind turbine powered compressed air based propulsion system for transporting resources as claimed in claim 1, wherein each of said plurality of tracks is a closed loop track.

5. The wind turbine powered compressed air based propulsion system for transporting resources as claimed in claim 1, wherein said processor determines path of each of said plurality of cars based on at least a destination code or a unique identifier.

6. The wind turbine powered compressed air based propulsion system for transporting resources as claimed in claim 1, further comprises one or more storage centres.

7. The wind turbine powered compressed air based propulsion system for transporting resources as claimed in claim 1, wherein the processor is further configured to control each of said plurality of cars on said plurality of tracks for a predetermined time interval.

* * * * *